Oct. 29, 1946.  T. F. SCHLICKSUPP  2,410,240
FEEDING MECHANISM FOR QUILTING MACHINES AND THE LIKE
Filed April 30, 1946  2 Sheets-Sheet 1
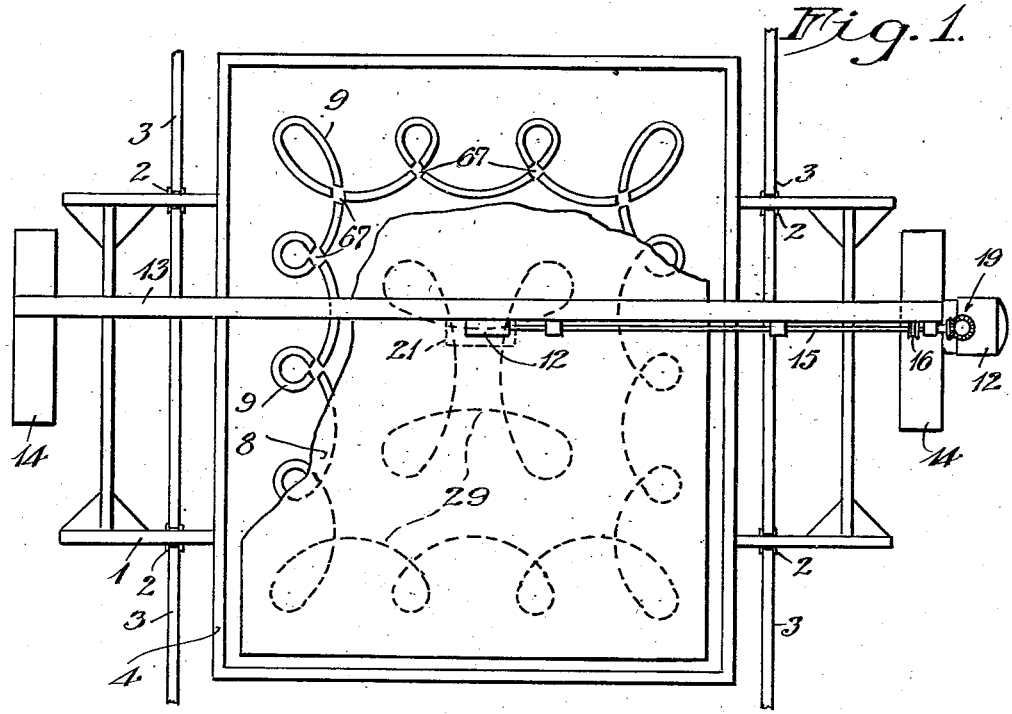
INVENTOR
THEODORE F. SCHLICKSUPP
BY
ATTORNEYS Oct. 29, 1946. T. F. SCHLICKSUPP 2,410,240
FEEDING MECHANISM FOR QUILTING MACHINES AND THE LIKE
Filed April 30, 1946 2 Sheets-Sheet 2
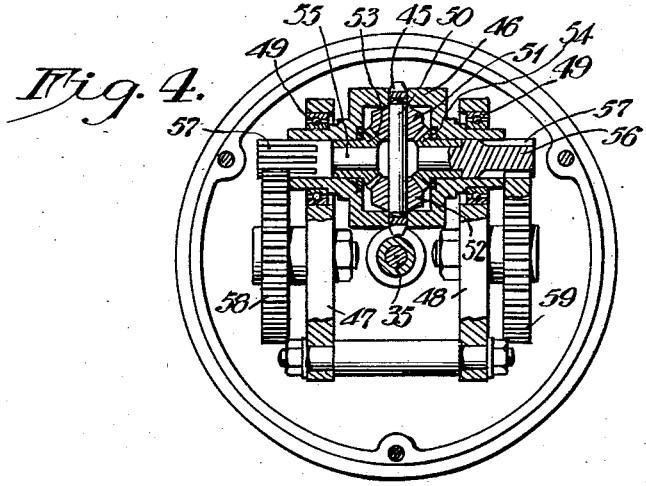
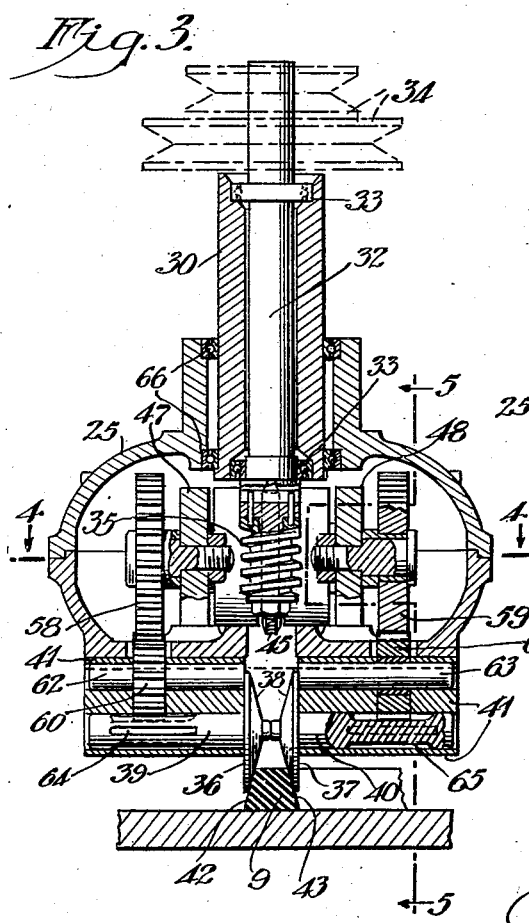
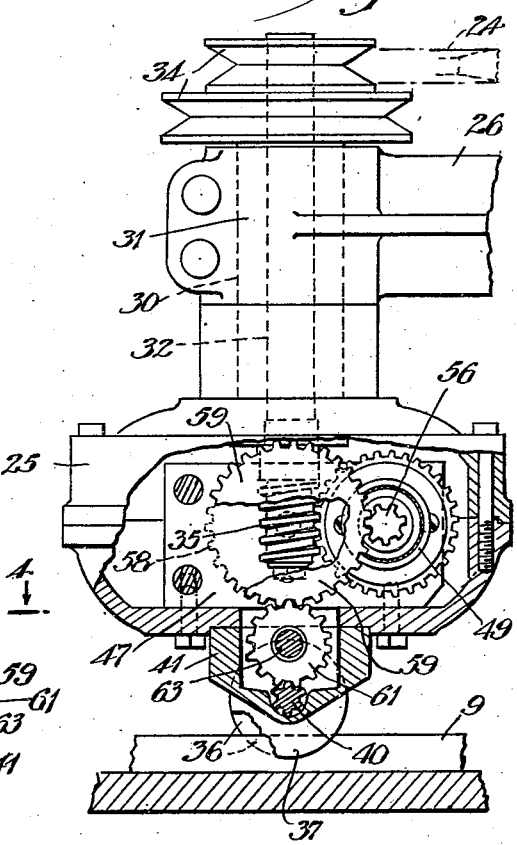
INVENTOR
THEODORE F. SCHLICKSUPP
BY
ATTORNEYS Patented Oct. 29, 1946

2,410,240

UNITED STATES PATENT OFFICE 2,410,240

FEEDING MECHANISM FOR QUILTING MACHINES AND THE LIKE

Theodore F. Schlicksupp, Long Island City, N. Y.

Application April 30, 1946, Serial No. 666,161

5 Claims. (Cl. 112—203)

This invention relates to feeding mechanism or producing relative movement along an irregular path between a work-piece and a tool or instrument that performs an operation of some kind on the work-piece. More particularly, the invention relates to automatic feeders for feeding material to be stitched in an irregular path past stitching mechanism, such as feeders employed in machines for stitching bed quilts along an irregular line which forms a symmetrical pattern.

In quilting operations, the material to be quilted is usually supported under the stitching mechanism so that it is capable of universal movement in a horizontal plane, as by providing a base carriage which is movable back and forth in a straight line, and a second carriage or frame which is mounted on the first and is movable thereon in a direction at right angles to the direction in which the base carriage is movable and which supports the material to be quilted. In one type of machine the top carriage and the material supported by it are caused to move in the proper path under the stitching mechanism by a template plate associated with the top carriage and having a groove which forms a pattern like that to be applied to the quilt by stitching, and by a pin on a stationary part of the machine frame which engages in the groove. The operator, by moving the top carriage in such a way that the template groove follows the pin, causes the quilt to move under the stitching mechanism in an irregular path such that the stitched pattern on the quilt will duplicate the pattern of the guiding groove. Instead of manually moving and guiding the top carriage as above described, it can be done automatically by using a template strip instead of the template groove and by employing a so-called feeder fastened to a stationary portion of the machine frame and having a power-driven traction wheel which engages the template strip and causes it to move progressively under the traction wheel, thereby moving the top carriage and the material supported by it in an irregular path under the stitching mechanism such that the stitched pattern on the finished quilt will correspond to the pattern formed by the template strip.

One object of the invention is to provide an automatic feeder of the kind referred to which is of improved construction and which operates more satisfactorily than feeders heretofore used.

Other objects of the invention are to provide an improved feeder which is adapted for use in any type of machine in which it is desired to produce relative movement along an irregular path between a work-piece and a tool or instrument that performs some kind of an operation upon the work-piece, and which makes it possible to use an inexpensive type of cooperating template; to provide an improved feeder which is especially adapted for use with a template made by applying to a base plate a strip of V-belting or the like shaped to the desired configuration; and to provide feeding mechanism having a feeder and a template strip and in which the feeder and template strip cooperate to produce a high degree of traction between the traction wheels of the feeder and template strip.

According to the invention, in its preferred form, the feeder has two traction wheels which engage opposite side walls of a template strip and which are driven from a power source through differential gearing so that they can rotate at different speeds when they are operating on a curved portion of the template strip. The template strip has side walls which converge upwardly and the traction wheels are mounted for rotation about a common horizontal axis and have confronting conical side faces which engage the inclined side walls of the template strip with a substantially line contact. The weight of the feeder forces the conical traction faces of the discs into contact with the converging side walls of the template strip with a wedging action which results in excellent traction.

The accompanying drawings show the improved feeder and illustrate in a more or less diagrammatic fashion how it may be applied to a stitching machine to automatically feed material to be quilted in an irregular path under the stitching mechanism. In the drawings:

Figure 1 is a plan view of the stitching machine;

Fig. 2 is an end elevation of the stitching machine;

Fig. 3 is a vertical section through the automatic feeder;

Fig. 4 is a horizontal section through the feeder taken approximately on the line 4—4 of Fig. 3; and Fig. 5 is a side elevation of the feeder, certain parts being shown in section taken on the line 5—5 of Fig. 3.

Referring first to Figs. 1 and 2, these figures show a stitching machine of the type which has been proposed for quilting operations. Only so much of the stitching machine is shown in Figs. 1 and 2 as will give an understanding of how the improved feeder is associated with it and how it performs its function when used in this type of machine. The machine comprises a base carriage 1 provided with rollers 2 (Fig. 2) adapted to run on a track 3 so that the carriage is freely movable horizontally in either direction on the track. An upper carriage or frame 4 is mounted by means of rollers 5 (Fig. 2) on the base carriage so that it is movable in a direction at right angles to the direction in which the base carriage 1 is movable along its track. The carriage 4 has an upper deck 6 and a lower deck 7. The upper deck is adapted to support the material to be quilted, represented at 8 in Fig. 1. The lower deck carries a template formed from a strip of material 9 arranged in a pattern of the kind which it is desired to produce on the quilt by the stitching. The presser foot and the needle of the stitching mechanism are represented at 10 and 11, respectively, and are mounted in a head 12 carried by a cross-piece 13 which is supported on standards 14. The needle is operated from a shaft 15 driven by means of a belt 16 from a countershaft 17, which in turn is driven by an electric motor 18. The shaft 15, through gearing shown at 19, drives a shaft 20 which operates the looper in a housing 21 mounted on a second cross-member 13' supported by the standards 14. The portion of the material 8 that is being stitched at any moment is supported on the looper housing 21 under the presser foot 10.

It will now been seen that the material to be stitched supported on the upper deck of the carriage 4 can be moved relative to the stitch mechanism, and since the carriage 4 is capable of universal movement in a horizontal plane it may be moved so that the material to be stitched can be moved in any desired direction under the stitching mechanism.

The improved feeder that produces movement of the upper carriage 4 so that the material will be stitched with the desired pattern is shown at 22 in Fig. 2. The detail construction of the feeder will be described later, but at this point it is sufficient to note that the feeder has a pair of traction wheels (only one of which appears at 23 in Fig. 2) adapted to cooperate with the template strip 9 and which are power-driven from the countershaft 17 by means of a belt 24. This belt drives the traction wheels in a manner hereinafter described through differential gearing in the housing 25 of the feeder. The feeder is clamped in one end of an arm 26, the other end of which is pivoted at 27 to a cross-piece 28 carried by the standards 14. The axis of the pivotal connection 27 is horizontal so that the housing 25 and the traction wheels are capable of vertical movement.

It will now be seen that as the traction wheels 23 rotate, the template strip 9 is caused to move progressively under them by the tractive effort exerted by the wheels, and this will cause the upper carriage 4 and the material supported by it to move in such a way under the stitching mechanism that the pattern formed by the template strip 9 is reproduced on the material by the line of stitching shown at 29 (Fig. 1). The traction wheels can swivel about a vertical axis as hereinafter described so that they can accommodate themselves to the turns in the template strip.

The detail construction of the feeder 22 is shown in Figs. 3, 4 and 5. Referring to these figures, the feeder comprises a sleeve 30 (Fig. 3) to which the free end of the feeder arm 26 is clamped as shown at 31 (Fig. 5). A vertical shaft 32 is rotatably mounted in the sleeve 30 by means of ball bearings 33. Several pulleys 34 of different diameters are secured to the upper end of the shaft. The lower end of the shaft carries a worm 35. The feeder housing 25 previously referred to encloses the worm and the above-mentioned differential gearing.

The two traction wheels are best shown at 36 and 37 (Fig. 3). Each wheel is disc-like in shape with a conical traction face 38. The traction wheels are carried by the inner ends of two horizontal shafts 39 and 40 whose axes are in alignment and which are rotatably mounted in a member 41 (Figs. 3 and 5) fastened to the under surface of the housing 25. The conical side face of one traction wheel confronts the conical side face of the other and the wheels are spaced the proper distance apart so that the conical faces of the traction wheels will engage the opposite converging side walls 42 and 43 (Fig. 3) of the template strip 9.

The two shafts 39 and 40 of the traction wheels are driven from the worm 35 through the differential and the other gearing now to be described. Referring to Fig. 4 it will be seen that the worm 35 meshes with the teeth 45 of a crown gear carried by a differential housing 46. The differential housing is rotatably mounted in standards 47 and 48 by means of ball bearings 49, the standards being supported on the bottom wall of the housing 25 as best shown in Fig. 3. The differential housing carries a shaft 50 on which two differential pinions 51 and 52 are mounted. The differential pinions mesh with bevel gears 53 and 54 on the ends of shafts 55 and 56, respectively, which are rotatably mounted in the differential gear housing 46. The outer end of each of the shafts 55 and 56 is machined to provide teeth 57 (Fig. 4) which mesh with the teeth on gears 58 and 59 rotatably mounted on the above-mentioned standards 47 and 48. The gears 58 and 59 mesh with pinions 60 and 61, respectively, (Fig. 3) carried by countershafts 62 and 63 rotatably mounted in the above-mentioned member 41 in which the traction wheel shafts 39 and 40 are mounted. The pinion 60 meshes with teeth 64 formed by machining the traction wheel shaft 39 and the pinion 61 meshes with teeth 65 formed by machining traction wheel shaft 40.

The housing 25 is mounted by means of ball bearings 66 on the lower end of the sleeve 30 so that it can swivel thereon about a vertical axis.

It will now be apparent that when the shaft 32 is driven by means of the belt 24 passing around one or the other of the pulleys 34, the worm 35 at the lower end of the shaft will rotate the differential housing, and the differential gearing will function in the usual manner to drive the traction wheels 36 and 37 at the same speed if they are operating on a straight portion of the template strip and to drive them at different speeds when the traction wheels are operating on a curved portion of the template strip, the drive being from the shafts 55 and 56 of the differential gearing to the gears 58 and 59 (Fig. 4) and from these gears to the traction wheel shafts 39 and 40 through the intermediate pinions 60 and 61 (Fig. 3). The rotation of the traction wheels will cause the template strip to move progressively past them and this will move the upper carriage 4 of the stitching machine as above described to stitch the quilt with a pattern duplicating the pattern of the template strip. Since the housing 25 can swivel, the traction wheels can accommodate themselves to the turns of the template strip, and since the conical faces of the traction wheels make substantially line contact with the side walls of the template strip, the contact is preserved even when the traction wheels are operating on a curved portion of the template strip. In rounding turns the traction wheel which is in engagement with the side wall of the template strip farthest from the center of curvature can rotate faster than the other traction wheel by reason of the differential gearing above described. The weight of the feeder may be wholly or partially carried by the traction wheels, and since the traction wheels grip the template strip with a wedge action, good traction is afforded. The feeder arm 26 may be counterweighted if desired or acted upon by a spring to increase the load on the traction wheels and thereby increase their traction on the template. The traction wheels are free to float vertically due to the pivotal connection of the feeder arm 26 to the frame of the machine, and this pivotal connection not only permits the traction wheels to press firmly against the template strip, but it also permits the feeder arm to be swung upwardly whenever desired to move the feeder to an inoperative position in which the traction wheels are out of engagement with the template strip.

The invention makes it possible to use for the template strip inexpensive material such as ordinary V-belting of the type which has converging side walls. Strips of such belting may be inverted and secured to a plate by nails or screws, and being very flexible, may be easily arranged in the pattern which it is desired to give to the stitching on the finished quilt. At places where portions of the template strip would otherwise intersect, it is of course necessary to leave gaps in the strip to provide cross-overs shown at 67 in Fig. 1 to permit the traction wheels when engaging one portion of the template strip to pass by the intersecting portion. Viewed in a different way, the invention provides a feeder which is designed especially for use with a template made from strips of V-belting or the like in cases where it is desired to use that type of template.

Instead of driving the shaft 32 of the feeder in the manner described, the pulleys 34 may be replaced by an electric motor mounted in substantially the same position as the pulleys and suitably geared to the shaft 32. This will make the feeder more self-contained.

The feeder herein described may be used in machines in which a stationary template is employed and in which it is desired to impart universal movement to some member to which the feeder is attached. For instance, in a machine in which a tool or instrument is mounted on a member capable of universal movement in a horizontal plane so that movement of such member will cause the tool to operate on a work-piece along an irregular path, the feeder may be attached to the universally movable member and the traction wheels may cooperate with a stationary template strip. In such an arrangement the rotating traction wheels would of course cause the feeder to follow the template strip and thus impart movement to the member on which the tool or instrument is mounted as distinguished from the reverse arrangement herein described in which the feeder is anchored to a stationary part of the machine and causes progressive movement of the template strip past the traction wheels.

I claim:

1. A feed device adapted to cooperate with a template to produce relative movement between a work-piece and a work-performing instrumentality along an irregular path, said feed device having a pair of traction wheels adapted to engage two side walls of the template, and power transmitting means for driving said traction wheels, said means including differential gearing adapted to allow one traction wheel to be driven faster than the other when the traction wheels are operating on curved portions of the template walls.

2. A feed device adapted to cooperate with a template to produce relative movement between a work-piece and a work-performing instrumentality along an irregular path, said feed device having a pair of traction wheels mounted to rotate about the same horizontal axis and having confronting conical side faces adapted to engage converging side walls of the template, and power transmitting means for driving said traction wheels, said means including differential gearing adapted to allow one traction wheel to be driven faster than the other when the traction wheels are operating on curved portions of the template walls.

3. In a machine having a work support and a work-performing instrumentality that are relatively movable, a template and a feed device cooperating therewith one of which is movable with one of said relatively movable parts and the other of which is fixed, said template comprising a raised strip of material, and the feed device having a pair of traction wheels adapted to engage two side walls of the template strip and further having power transmitting means for driving the wheels, said means including differential gearing adapted to allow one traction wheel to be driven faster than the other when the traction wheels are operating on a curved portion of the template strip.

4. In a machine having a work support and a work-performing instrumentality that are relatively movable, a template and a feed device cooperating therewith one of which is movable with one of said relatively movable parts and the other of which is fixed, said template comprising a raised strip of material having converging side walls, and the feed device having a pair of traction wheels with confronting conical side faces adapted to engage the converging side walls of the template strip and further having power transmitting means for driving the wheels, said means including differential gearing adapted to allow one traction wheel to be driven faster than the other when the traction wheels are operating on a curved portion of the template strip.

5. A feed device for cooperation with a template comprising a sleeve, a shaft rotatably mounted in the sleeve, means for rotating the shaft, a worm carried by the shaft beyond one end of the sleeve, a housing mounted for swivelling movement on the sleeve and enclosing said worm, differential gearing within the housing adapted to be driven by said worm, a pair of traction wheels rotatably associated with said housing and mounted to rotate about a common axis, and means for rotating said traction wheels from said differential gearing.

THEODORE F. SCHLICKSUPP.